United States Patent
Atkins et al.

(10) Patent No.: US 6,865,327 B2
(45) Date of Patent: Mar. 8, 2005

(54) METHOD OF MAKING OPTICAL FIBER WITH REDUCED E-BAND AND L-BAND LOSS PEAKS

(75) Inventors: Robert M. Atkins, Millington, NJ (US); Alice W. Liu, Alpharetta, GA (US); Poul Kristensen, Valby (DK); Morten Østergaard Pedersen, Vallensbaek (DK); Stig Nissen Knudsen, Fredriksberg (DK); Jan Levin Nielsen, Solrød Strand (DK); Jake Bromage, North Plainfield, NJ (US); Kai H. Chang, Suwanee, GA (US)

(73) Assignee: Fitel USA Corp., Norcross, GA (US)

( * ) Notice: Subject to any disclaimer, the term of this patent is extended or adjusted under 35 U.S.C. 154(b) by 196 days.

(21) Appl. No.: 10/247,100

(22) Filed: Sep. 19, 2002

(65) Prior Publication Data

US 2004/0042746 A1 Mar. 4, 2004

Related U.S. Application Data

(60) Provisional application No. 60/407,027, filed on Aug. 30, 2002.

(51) Int. Cl.[7] ................................................ G02B 6/02
(52) U.S. Cl. ..................................... 385/123; 385/141
(58) Field of Search ........................ 385/123, 76, 124, 385/141

(56) References Cited

U.S. PATENT DOCUMENTS

| 5,145,508 A | * | 9/1992 | Fujiura et al. ................ 65/388 |
| 5,259,856 A | * | 11/1993 | Ohga et al. .................... 65/426 |
| 5,597,398 A | * | 1/1997 | Ishikawa et al. .............. 65/413 |
| 5,958,809 A | * | 9/1999 | Fujiwara et al. .............. 501/54 |
| 2002/0005051 A1 | * | 1/2002 | Brown et al. ................. 65/414 |
| 2003/0037568 A1 | * | 2/2003 | Fujiwara et al. ............. 65/17.4 |

FOREIGN PATENT DOCUMENTS

| EP | 0520422 A2 | 12/1992 |
| EP | 1179514 A1 | 2/2002 |

OTHER PUBLICATIONS

Patent Abstracts of Japan, vol. 012, No. 252 (C–512); (Jul. 15, 1988); & JP 63 040742 A (Shimadzu Corp.), (Feb. 22, 1988) Abstract.
Database WPI; Section CH, Week 09; Derwent Publications Ltd., London, GB; AN 1984–053735;XP002263122 & JP 59 013640 A (NT&T Corp. et al), (Jan. 24, 1984) Abstract.
Patent Abstracts of Japan, vol. 2002, No. 06, (Jun. 4, 2002) & JP 2002 060238 A (Mitsubishi Cable Ind Ltd; Tokyo Electric Power Co. Inc. : The), (Feb. 26, 2002) Abstract Table 1.

(List continued on next page.)

*Primary Examiner*—Frank G. Font
*Assistant Examiner*—K. Cyrus Kianni
(74) *Attorney, Agent, or Firm*—Lowentein Sandler PC

(57) ABSTRACT

Applicants have discovered the existence of loss peaks in optical fiber transmission systems using wavelengths in the E-band and the L-band. Specifically, they have discovered the existence of narrow loss peaks at 1440 nm, 1583 nm and 1614 nm. Because the peaks are relatively narrow, they cannot be easily removed by conventional gain equalizers in long haul transmission systems, and although the peaks are relatively small, they can nonetheless cause transmission channels to drop out in amplified DWDM transmission systems. Applicants have further discovered that these loss peaks are due to carbon contamination of the transmission fiber. Thus optical fibers should be fabricated essentially free of carbon contamination. This means eliminating carbon-containing reagents in preform and tube-making processes.

14 Claims, 2 Drawing Sheets

OTHER PUBLICATIONS

Patent Abstracts of Japan; vol. 004; No. 046 (C–006); (Apr. 10, 1980) & JP 55 020249 A (Nippon Telegr & Teleph Corp; Others: 01) (Feb. 13, 1980) Abstract.

Patent Abstracts of Japan; vol. 009; No. 130 (C–284), (Jun. 5, 1985) & JP 60 0168281 A (Furukawa Denki Kogyo KK; Others: 01), (Jan. 28, 1985) Abstract.

* cited by examiner

METHOD OF MAKING OPTICAL FIBER WITH REDUCED E-BAND AND L-BAND LOSS PEAKS

CROSS REFERENCE TO RELATED APPLICATIONS

This application claims the benefit of U.S. Provisional Application Ser. No. 60/407,027 filed by Alice Liu et al. on Aug. 30, 2002 and entitled "Method of Making Optical Fiber With Reduced E-Band and L-Band Loss Peaks".

FIELD OF THE INVENTION

This invention relates to optical fibers and, in particular, to a method of making optical fibers having reduced E-band and L-band loss peaks and to fibers made by the method. The method and fibers are particularly useful for broadband transmission.

BACKGROUND OF THE INVENTION

Optical fibers are key components in modern telecommunications systems. Basically, an optical fiber is a thin strand of glass capable of transmitting optical signals containing a large amount of information over long distance with low loss. Advantageously the fiber transmits all wavelengths of interest with the same low loss.

In its simplest form, an optical fiber is a small diameter waveguide comprising a core having a first index of refraction peripherally surrounded by a cladding having a second (lower) index of refraction. Typically optical fibers are composed of high purity silica with minor concentrations of dopants to control the index of refraction.

Optical fibers are typically fabricated by a two-step process that involves, as a first step, the fabrication of a specially constructed glass rod called a preform, and, as a second step, drawing the preform into the fiber.

Preforms are commercially fabricated using thermal chemical vapor reactions that form mixed oxides. The oxides are deposited as layers of glass soot (particles) onto a rotating mandrel or a high purity tube. The deposited soot is then consolidated by a sintering process and collapsed into a clear preform for fiber draw. The most commonly used commercial preform fabrication processes are 1) modified chemical vapor deposition (MCVD), outside vapor deposition (OVD) and vapor phase axial deposition (VAD).

The MCVD process differs from OVD and VAD in that the vapor deposition in MCVD occurs on the inside surface of the glass starting tube. The preform is built up from the outside to the inside by forming glassy layers of doped silica particles on the inside surface of the starting tube. Upon completing the various deposited layers, the tube is collapsed into a solid rod. Further details concerning the MCVD process can be found in U.S. Pat. Nos. 4,909,816; 4,217,027 and 4,334,903 issued to MacChesney et al. and incorporated herein by reference.

In the OVD process the soot stream deposits on the outer surface of a mandrel and builds up radially to form a porous body. After the mandrel is removed, the body is inserted into a consolidation furnace where it is dried and sintered. Further details concerning the OVD process are set forth in U.S. Pat. Nos. 3,375,075 and 3,826,560 which are incorporated herein by reference.

In the VAD process the soot stream deposits on the end of a target rod and builds up axially to form a porous body similar to that produced by the OVD process except that the VAD body has no axial aperture. The VAD body is dried, sintered to dense glass and drawn to fiber. Further details concerning the VAD process are set forth in T. Izawa et al "Continuous fabrication of high silica fiber preform", IOOC '71, C1-1, pp. 375–378, July 1977.

These three major processes (MCVD, OVD and VAD) all use similar chemical delivery systems to deposit glass soot. The most abundant reagent is silicon tetrachloride ($SiCl_4$) which reacts with oxygen to form silica ($SiO_2$). Small amounts of other compounds are used to dope the silica and change its refractive index. Germanium tetrachloride ($GeCl_4$) and phosphorous oxychloride ($POCl_3$) are used to raise the refractive index above silica. Freons (e.g. $CF_3Cl$, $CF_4$, $CF_3Br$, $C_2F_6$ or $CCl_2F_2$), are often used to lower the index of refraction. During the collapse phase of preform production, carbon tetrachloride ($CCl_4$) or chlorine ($Cl_2$) is often introduced as a drying agent in order to maintain low water levels.

As mentioned above, it is highly desirable that the optical fiber produced by these processes should transmit wavelengths of interest with substantially uniform low loss. Unfortunately, as the range of utilized wavelengths have extended into the L-band, uniform low loss is not the case.

SUMMARY OF THE INVENTION

Applicants have discovered the existence of loss peaks in optical fiber transmission systems using wavelengths in the E-band and the L-band. Specifically, they have discovered the existence of narrow loss peaks at 1440 nm, 1583 nm and 1614 nm. Because the peaks are relatively narrow, they cannot be easily removed by conventional gain equalizers in long haul transmission systems, and although the peaks are relatively small, they can nonetheless cause transmission channels to drop out in amplified DWDM transmission systems.

Applicants have further discovered that these loss peaks are due to carbon contamination of the transmission fiber. Thus optical fibers should be fabricated essentially free of carbon contamination. This means eliminating carbon-containing reagents in preform and tube-making processes.

BRIEF DESCRIPTION OF THE DRAWINGS

The nature, advantages and various additional features of the invention will appear more fully upon consideration of the illustrative embodiments now to be described in connection with the accompanying drawings. In the drawings.

It is to be understood that these drawings are for illustrating the concepts of the invention and, except for the graphs, are not to scale.

DETAILED DESCRIPTION

Figure 1:
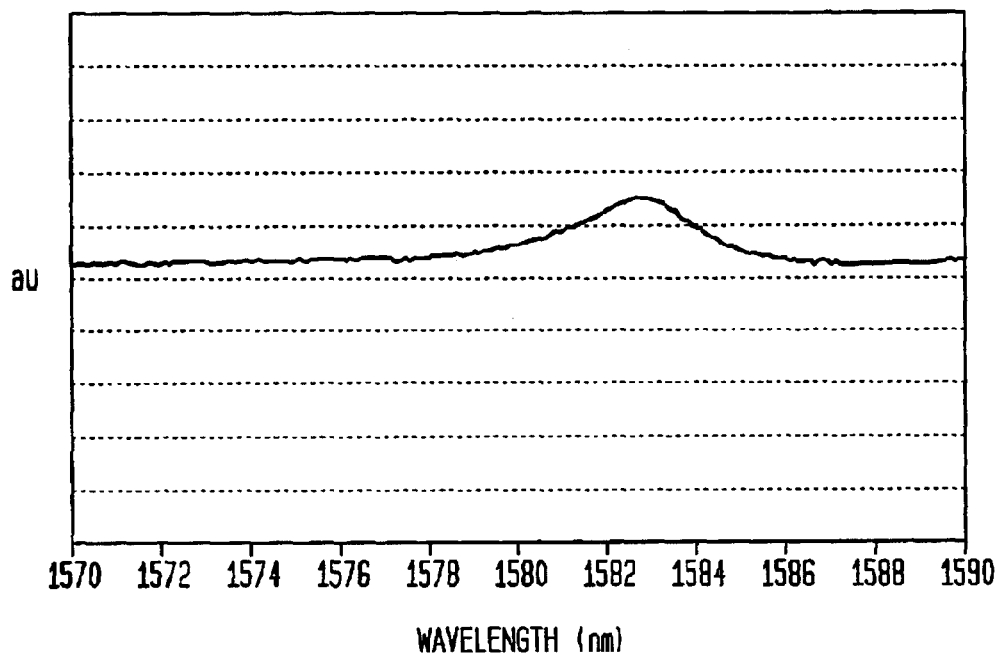
FIG. 1 is a spectral loss curve of a transmission fiber showing a typical carbon-induced loss peak.

In a study of long haul optical fiber transmission systems using light channels in the E-band (1360 nm to 1460 nm) and the L-band (1565 nm to 1625 nm), applicants have discovered the existence of previously unknown narrow and relatively small loss peaks at 1440 nm and 1583 nm and 1614 nm wavelengths. FIG. 1 illustrates a typical such loss peak at the 1583 nm wavelength. The 1440 nm and 1614 nm loss peaks are similar in width and magnitude. These peaks are sufficiently narrow in width that they cannot be easily removed by gain equalizers in long haul transmission systems. And while relatively small, the losses are sufficient to cause the drop of transmission channels in E-band and L-band long haul DWDM optical fiber transmission systems. Applicants have further determined that these loss peaks are due to carbon contamination of the optical transmission fibers.

In accordance with the invention, an optical fiber is made by a process that rigorously avoids carbon contamination. In essence, a fiber is drawn from a preform that is essentially free of carbon contamination. This means that any starting glass such as the glass of a starting tube is essentially free of carbon. It also means that the soot is deposited by a process essentially free of carbon-containing reagents and that the deposited soot is sintered and consolidated without carbon-containing reagents.

Figure 2:
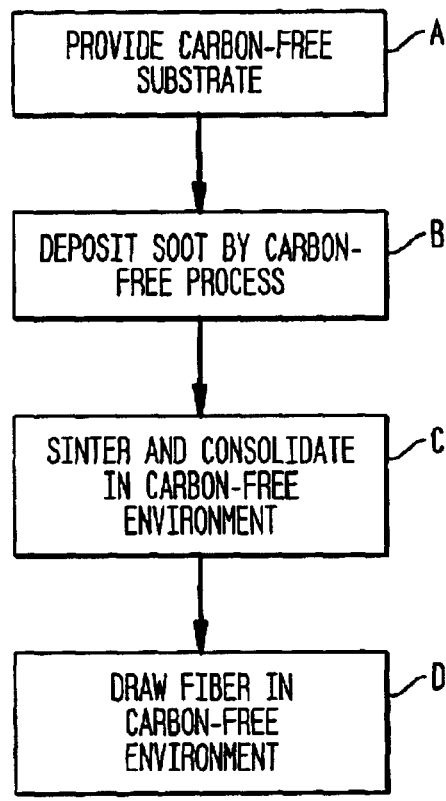
FIG. 2 is a schematic flow diagram of a process for making optical transmission fiber in accordance with the invention.

FIG. 2 is a schematic flow diagram of a process for making carbon-free optical transmission fiber comprising, as an initial step A, the provision of a carbon-free substrate for the deposition of glass soot. The term carbon-free as used herein means that reagent used in optical fiber manufacturing has concentration less than 1000 ppm by weight of carbon, preferably less than 10 ppm and even more preferably less than 1 ppm. The substrate is typically a glass tube or mandrel. The glass substrate should be made by a process which avoids carbon-containing reagents to produce a carbon-free substrate.

The next step, depicted in block B, is to deposit glass soot on the substrate using a vapor deposition process essentially free of carbon-containing reagents. By essentially free of carbon-containing reagents is meant the average carbon content of all reagents have a carbon content less than 10 ppm by weight. This means eliminating carbon-containing reagents for down-doping such as $C_2F_6$, $CF_4$ and $CCl_2F_2$ and using carbon-free substitutes such as $SF_6$ or $SiF_4$. The soot deposition can be by the MCVD, VAD or OVD processes thus modified.

The third step (Block C) is to sinter and consolidate the deposited soot in an environment essentially free of carbon-containing reagents to form a carbon-free glass preform. This means eliminating $CCl_4$ or other carbon-containing drying agents and substituting carbon-free agents such as $Cl_2$, $GeCl_4$ or $SiCl_4$.

The final step in Block D is to draw the fiber from the preform in an environment essentially free of carbon-containing reagents. In essence, the preform is inserted into a refractory furnace to draw fiber from the preform in the usual manner. For example, the preform is lowered into the insulated susceptor of an induction furnace where it is heated to a high drawing temperature. Upon sufficient heating, a melted end portion bearing a glass strand drops, and the strand is inserted into a drawing station such as described in *Optical Fiber Telecommunications*, Ed. S. E. Miller and L. P. Kaminow, pp. 182–185 (Academic Press, 1988). The tension and draw rate are adjusted to draw a fiber of desired diameter. After drawings, the fiber can be coated with conventional protective polymer that need not be carbon free. The result is carbon-free fiber with reduced E-band and L-band loss peaks.

The invention may now be more clearly understood by consideration of the following specific example.

EXAMPLE

A carbon-free starting tube comprising carbon-free silica is obtained from Heraeus Tenevo under the tradename F300. The tube is made by OVD without using carbon-containing reagents. It has dimensions 21.58 mm in ID and 28.0 mm in OD.

Glass soot is deposited on the interior surface of the starting tube by the MCVD process modified to be essentially free of carbon-containing reagents. In a specific case, the following conditions are used to deposit glass on the starting tube:

| Region | Carrier $O_2$ for $SiCl_4$ (slpm) | Carrier $O_2$ for $GeCl_4$ (slpm) | $SF_6$ (sccm) | Excess $O_2$ (slpm) | He (slpm) | $Cl_2$ (sccm) | Δ | Temp (C.) |
|---|---|---|---|---|---|---|---|---|
| Core | 0.46 | 0.49 | 0 | 2.0 | 4.0 | 0 | 0.3% | 2050 |
| Trench | 1.28 | 0 | 22.0 | 2.0 | 3.2 | 0 | −0.1% | 2037–2100 |
| Collapse | 0 | 0 | 0 | 0 | 0 | 75.0 | | 2100 |

The deposited soot is sintered and consolidated in a $Cl_2$ environment essentially free of carbon-containing reagents, and the structure is collapsed into a solid preform rod. After collapse, carbon-free fiber is drawn from the preform in a carbon-free refractory furnace. The drawn fiber is coated with a conventional urethane methacrylate fiber polymer coating, and the resulting fiber is essentially free of the carbon loss peaks at 1440 nm, 1583 nm and 1614 nm.

Figure 3:
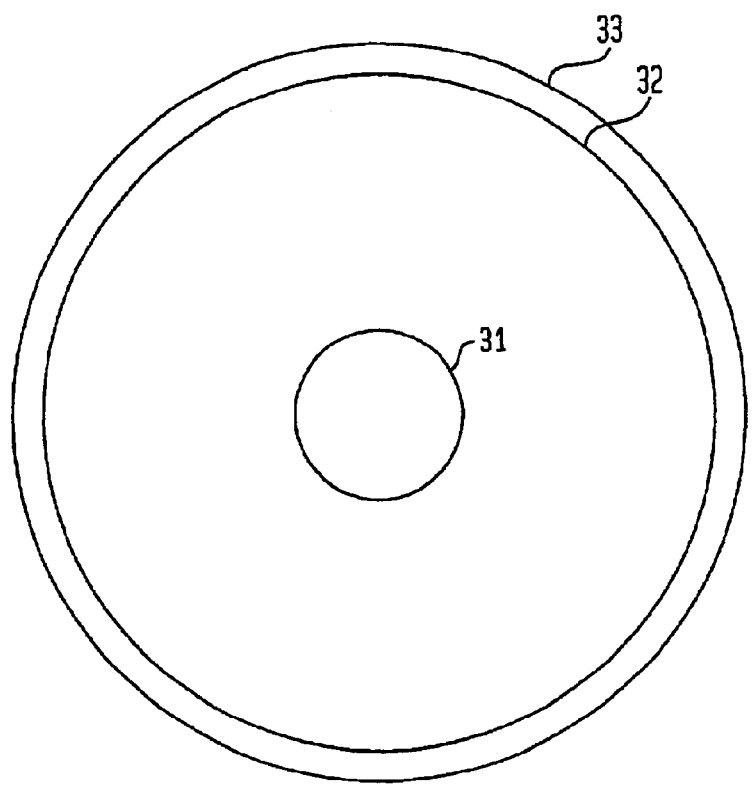
FIG. 3 is a schematic cross section of an optical transmission fiber made by the process of FIG. 2.

FIG. 3 is a schematic cross section of the fiber 30 produced by the process of FIG. 2. The fiber 30 comprises a core 31 peripherally surrounded by a cladding 32 and a polymer cover 33. The core can be germania, carbon free silica, and the cladding can be undoped or fluorine-doped carbon-free silica. The polymer coating can be a conventional fiber polymer coating and need not be carbon free. This process is applicable to both single and multi-mode fiber manufacturing. Typical dimensions for a single mode fiber are core diameter 7 to 14 micrometers and cladding diameter 125 micrometers.

Figure 4:
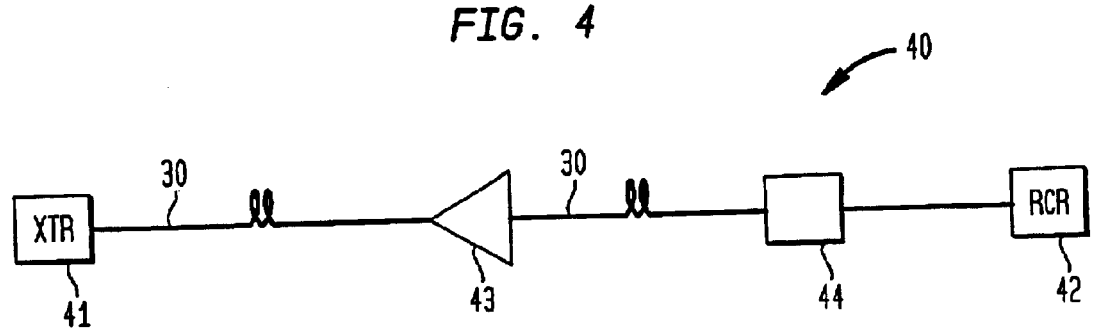
FIG. 4 is a schematic diagram of an optical fiber transmission system employing the fiber of FIG. 3.

FIG. 4 is a schematic diagram of an optical fiber transmission system 40 using the fiber 30 of FIG. 3. In essence, the system 40 comprises a multiple-wavelength transmitter 41, a transmission path comprising carbon-free fiber 30 and an optical receiver 42. The system 40 may include one or more optical amplifiers 43 and one or more dispersion compensators 44 located at various points along the transmission path, as well as add/drop nodes (not shown). The transmitter is preferably an L-band or E-band transmitter capable of transmitting a signal channel at one or more of the wavelengths at 1440 nm, 1583 nm or 1614 nm.

It is understood that the above-described embodiments are illustrative of only a few of the many possible specific embodiments, which can represent applications of the invention. Numerous and varied other arrangements can be made by those skilled in the art without departing from the spirit and scope of the invention.

We claim:

1. A method for making an optical transmission fiber having reduced E-band and L-band loss peaks comprising the steps of:
   providing an essentially carbon-free substrate for the deposition of glass soot;
   depositing glass soot on the substrate by a vapor deposition process essentially free of carbon-containing reagents;
   sintering and consolidating the glass soot in an environment essentially free of carbon-containing reagents to form a carbon-free glass preform;
   and drawing fiber from the preform in an environment essentially free of carbon-containing reagents to form an essentially carbon-free glass optical transmission fiber for transmitting at least one optical signal channel in the range from 1440 nm to 1614 nm, the transmission of the channel essentially free of loss peaks at 1440 nm. 1583 nm and 1614 nm.

2. The method of claim 1 wherein the carbon-free substrate comprises a carbon-free glass tube.

3. An optical fiber made by the process of claim 2.

4. The method of claim 1 wherein the glass soot is deposited on the substrate by a process selected from the group consisting of MCVD, OVD and VAD.

5. An optical fiber made by the process of claim 4.

6. The method of claim 1 wherein the glass soot is sintered and consolidated in an environment comprising $Cl_2$ as a drying agent.

7. An optical fiber made by the process of claim 6.

8. The method of claim 1 wherein the carbon-free glass fiber contains less than 1000 ppm by weight of carbon.

9. An optical fiber made by the process of claim 8.

10. The method of claim 8, wherein the essentially carbon-free glass fiber contains less than 10 ppm by weight of carbon.

11. The method of claim 10 wherein the essentially carbon-free glass fiber contains less than 1 ppm by weight of carbon.

12. An optical fiber made by the process of claim 11.

13. An optical fiber made by the process of claim 10.

14. An optical fiber made by the process of claim 1.

* * * * *